(12) United States Patent
Santos

(10) Patent No.: US 12,358,623 B2
(45) Date of Patent: Jul. 15, 2025

(54) AUGMENTED REALITY THROUGH DIGITAL AIRCRAFT WINDOWS OF AIRCRAFT INFLIGHT ENTERTAINMENT SYSTEMS

(71) Applicant: Thales Avionics, Inc., Irvine, CA (US)

(72) Inventor: Samuel Santos, Eastvale, CA (US)

(73) Assignee: Thales Avionics, Inc., Irvine, CA (US)

( * ) Notice: Subject to any disclaimer, the term of this patent is extended or adjusted under 35 U.S.C. 154(b) by 205 days.

(21) Appl. No.: 18/346,349

(22) Filed: Jul. 3, 2023

(65) Prior Publication Data

US 2024/0010340 A1   Jan. 11, 2024

Related U.S. Application Data

(60) Provisional application No. 63/358,705, filed on Jul. 6, 2022.

(51) Int. Cl.
| | |
|---|---|
| *G06T 19/00* | (2011.01) |
| *B64D 11/00* | (2006.01) |
| *G06T 7/70* | (2017.01) |
| *G06V 20/59* | (2022.01) |
| *G06V 40/10* | (2022.01) |

(52) U.S. Cl.
CPC ............ *B64D 11/0015* (2013.01); *G06T 7/70* (2017.01); *G06T 19/006* (2013.01); *G06V 20/59* (2022.01); *G06V 40/10* (2022.01); *G06T 2207/30244* (2013.01); *G06T 2207/30268* (2013.01)

(58) Field of Classification Search
CPC ..................... G06T 7/70; G06T 19/006; G06T 2207/30244; G06T 2207/30268; G06V 20/59; G06V 40/10
See application file for complete search history.

(56) References Cited

U.S. PATENT DOCUMENTS

| | | | |
|---|---|---|---|
| 9,864,559 B2 | 1/2018 | Sizelove | |
| 2019/0325219 A1* | 10/2019 | Lin | ......................... G06V 40/28 |
| 2020/0223444 A1* | 7/2020 | Bonanni | ............... G06V 20/597 |

* cited by examiner

*Primary Examiner* — Grace Q Li
(74) *Attorney, Agent, or Firm* — Sage Patent Group

(57) ABSTRACT

An augmented reality (AR) system for an aircraft obtains an aircraft pose, determines a passenger pose relative to a window, and computes a field-of-view of the passenger. Operations select a set of passenger-relevant points of information (POIs) from a database that satisfy a relevance rule to the real-world objects viewable by the passenger through the window. For each of the passenger-relevant POIs in the set, operations determine an AR indicia to be displayed, and an AR indicia pose where the AR indicia is to be rendered on a display device. Operations generate a display command based on the AR indicia and the AR indicia pose for the passenger-relevant POIs in the set. Operations provide the display command to the display device to display renderings of the AR indicias with the AR indicia poses to augment the real-world objects viewed by the passenger through the window.

16 Claims, 7 Drawing Sheets

AUGMENTED REALITY THROUGH DIGITAL AIRCRAFT WINDOWS OF AIRCRAFT INFLIGHT ENTERTAINMENT SYSTEMS

RELATED APPLICATION

This application is a non-provisional application which claims the benefit of priority to provisional application Ser. No. 63/358,705 filed on Jul. 6, 2022. The disclosure of the above-referenced application is hereby incorporated herein in its entirety by reference.

FIELD OF THE INVENTION

The described embodiments relate generally to display technologies of aircraft inflight entertainment systems for displaying information to aircraft passengers.

BACKGROUND

Inflight entertainment (IFE) systems are deployed onboard aircraft to provide entertainment services for passengers in a passenger cabin. The IFE systems typically distribute on-demand and/or streaming channels of movie, television, audio, electronic publications, and gaming entertainment programming to passenger-operated electronic communication devices. The passenger-operated electronic communication devices can include, without limitation, seat video units which are mounted to individual seats, e.g., seatbacks or armrests, and/or passenger electronic devices (PEDs) transported onboard aircraft.

Passenger satisfaction with the flight experience and, ultimately, with the airline can be significantly impacted by the functionality of an IFE system and by what content is made available to passengers through the IFE system. There is a need to provide innovative passenger experiences through the IFE system with dynamically changing content in a continuing effort to improve passenger flight satisfaction.

SUMMARY

Some embodiments of the present disclosure are directed to an augmented reality (AR) system for an aircraft. The AR system includes at least one network interface, at least one processor connected to communicate through at least one network interface, and at least one memory storing instructions executable by the at least one processor to perform operations. The operations obtain an aircraft pose for the aircraft. Operations determine a passenger pose indicating a pose of a passenger relative to a window in the aircraft. Operations compute a field-of-view of the passenger through the window toward real-world objects viewable by the passenger through the window, based on the passenger pose and the aircraft pose. Operations select a set of passenger-relevant points of information (POIs) from a database that satisfy a relevance rule to the real-world objects viewable by the passenger through the window, based on the aircraft pose and the field-of-view. For each of the passenger-relevant POIs in the set, operations determine an AR indicia to be displayed, and determine an AR indicia pose where the AR indicia is to be rendered on a display device associated with the passenger, based on the aircraft pose and the field-of-view. Operations generate a display command based on the AR indicia and the AR indicia pose for the passenger-relevant POIs in the set. Operations provide the display command to the display device to display renderings of the AR indicias with the AR indicia poses to augment the real-world objects viewed by the passenger through the window.

The AR system operations may be performed entirely by IFE system components, by a passenger electronic device, and/or by a combination thereof.

Other AR systems and correspond methods and computer program products according to embodiments of the inventive subject matter will be or become apparent to one with skill in the art upon review of the following drawings and detailed description. It is intended that all such additional AR systems, methods, and computer program products be included within this description, be within the scope of the present inventive subject matter, and be protected by the accompanying claims. Moreover, it is intended that all embodiments disclosed herein can be implemented separately or combined in any way and/or combination.

BRIEF DESCRIPTION OF THE DRAWINGS

Other features of embodiments will be more readily understood from the following detailed description of specific embodiments thereof when read in conjunction with the accompanying drawings, in which.

DETAILED DESCRIPTION

In the following detailed description, numerous specific details are set forth in order to provide a thorough understanding of embodiments of the present disclosure. However, it will be understood by those skilled in the art that the present invention may be practiced without these specific details. In other instances, well-known methods, procedures, components and circuits have not been described in detail so as not to obscure the present invention. It is intended that all embodiments disclosed herein can be implemented separately or combined in any way and/or combination.

Traditionally, the flight experience provided by IFE systems to passengers has been relatively similar to what passengers have been able to experience at home and in an airline terminal. For example, IFE systems have provided access to movies, television stations, audio programming, electronic publications, and gaming entertainment through seat video units and PEDs. Airline passengers are also provided windows along the fuselage as another viewing option.

Embodiments of the present disclosure are directed to systems that are configured to provide innovative through-the-window augmented reality (AR) viewing capabilities for passengers.

Figure 1:
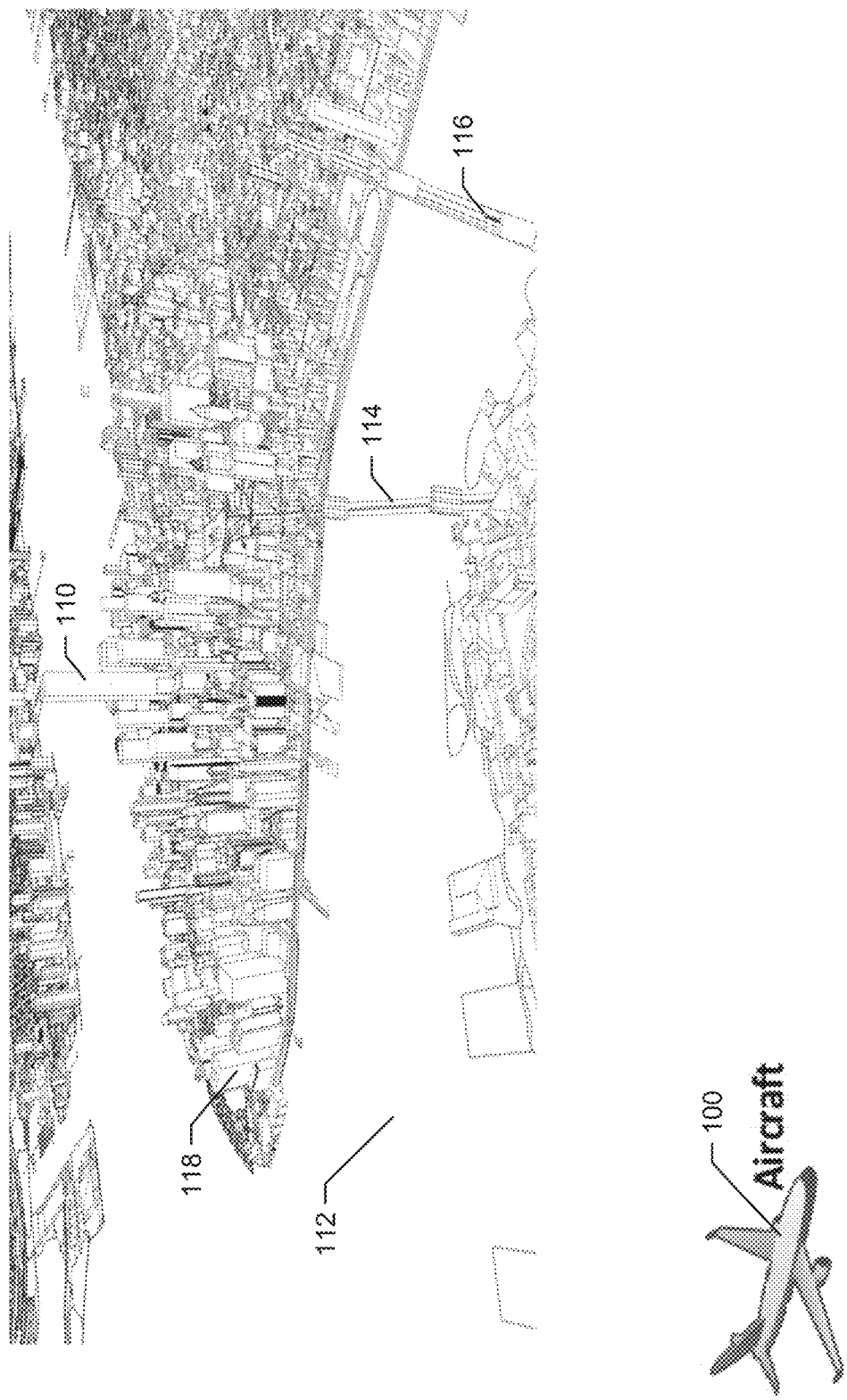
FIG. 1 illustrates a city landscape which can be viewed by passengers through digital aircraft windows which are configured to display AR indicia to augment the passengers' view of points of interest, in accordance with some embodiments of the present disclosure.

FIG. 1 illustrates a city landscape which can be viewed by passengers through digital aircraft windows of aircraft 100. The digital aircraft windows include display devices that are configured to display AR indicia to augment the passengers' view of points of interest.

Some embodiments are directed to digital aircraft windows for displaying various types of information and graphical objects, such as graphical animations, for viewing by passengers as an overlay as indicia on their view of some real-world objects outside the aircraft or as images that may obscure or cover some of the real-world objects. In accordance with some embodiments of the present disclosure, an IFE system onboard the aircraft 100 is configured to identify points-of-interest (POIs), such as a physical features of the Earth's surface (e.g., mountains, valleys, lakes, rivers, other landforms, undersea terrain, undersea shipwrecks, undersea reefs, etc.), ground-based man-made features (e.g., statues, monuments, buildings, stadiums, cities, dams, roads, etc.), air-based objects (e.g., other aircraft, cloud formations, weather patterns, etc.), etc. In the illustrated example, the IFE system has identified names and other defined information for a river 112, buildings 110 and 118, bridges 114 and 116, etc. The IFE system is configured to display relevant information on digital aircraft windows (e.g., see-through display devices) which are configured to position where the information is displayed so that it can be logically associated with the POIs viewed by the passengers through the digital aircraft windows. For example, the information can be controlled to be displayed at locations on a digital aircraft window so as to be viewed by a passenger as being adjacent to, e.g., within a threshold distance of or overlapping, the respective POI.

Figure 2:
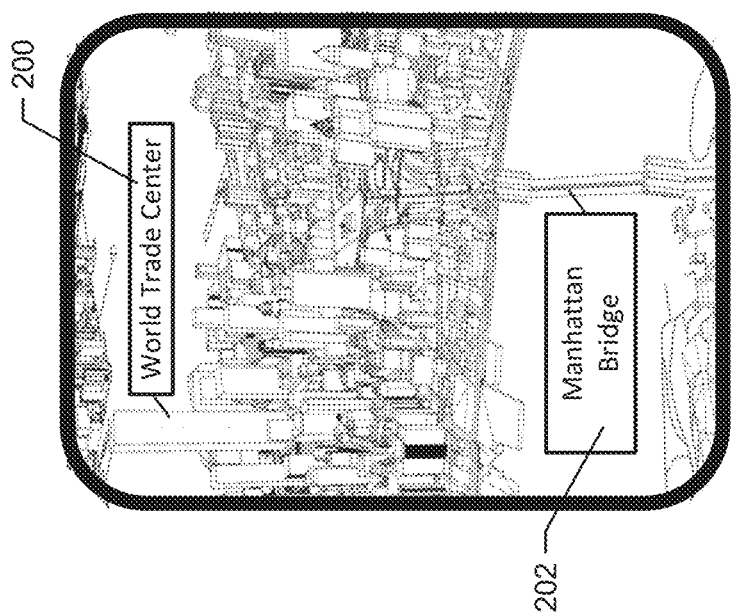
FIG. 2 illustrates a view of a digital aircraft window in which an IFE system displays POI information at locations viewed by a passenger as being adjacent to the corresponding POI, in accordance with some embodiments of the present disclosure.

FIG. 2 illustrates a digital aircraft window which displays an identifier 202 for the Manhattan Bridge at a location viewed from the point-of-view of the passenger as being adjacent to the physical bridge when viewed through the digital aircraft window, and similarly displays an identifier 200 for the World Trade Center at a location viewed from the point-of-view of the passenger as being adjacent to the physical building when viewed through the digital aircraft window.

Figure 3:
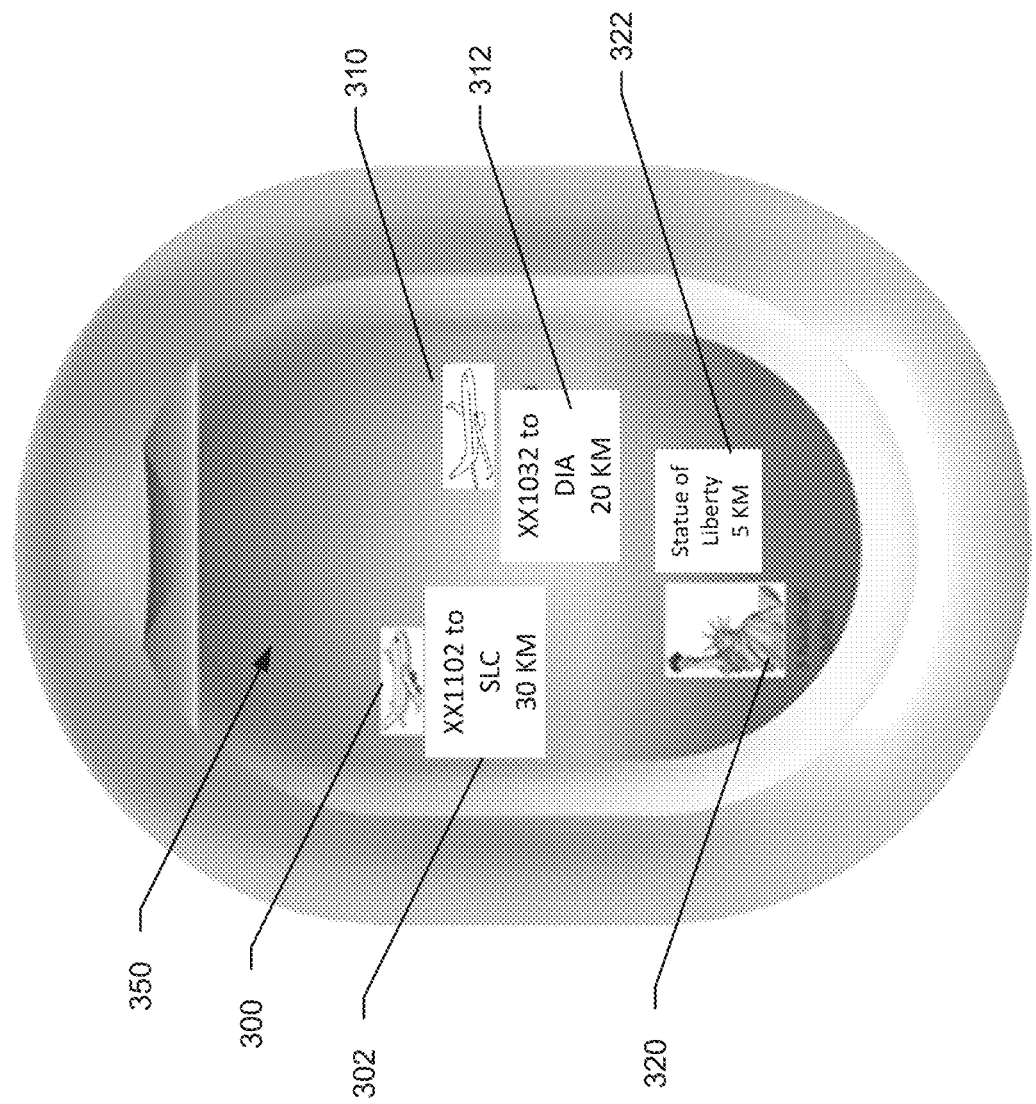
FIG. 3 illustrates another view of a digital aircraft window in which an IFE system displays POI information at locations viewed by a passenger as being adjacent to the corresponding POI, in accordance with some embodiments of the present disclosure.

FIG. 3 illustrates another AR view of a digital aircraft window 350 in which an IFE system displays, at a location viewed by a passenger as being adjacent to an aircraft 300 viewed through the window 350, information 302 relating to the aircraft 300 which identifies its flight number XX1102, destination city of Salt Lake City, and present distance of 30 kilometers from the passenger. The IFE system also displays, at another location viewed by a passenger as being adjacent to another aircraft 310 viewed through the window 350, information 312 relating to the aircraft 310 which identifies its flight number XX1032, destination city of Denver International Airport, and present distance of 20 kilometers from the passenger. The IFE system also displays, at another location viewed by a passenger as being adjacent to a ground feature 320 which the passenger sees through the window 350, information 322 relating to the ground feature 320 which identifies its name and present distance from the passenger. The information displayed in the AR view is dynamically updated over time to track changes in what points of interest (POIs) are no longer viewable, what new POIs have become viewable, and update information such as indicated distances to various POIs.

Figure 4:
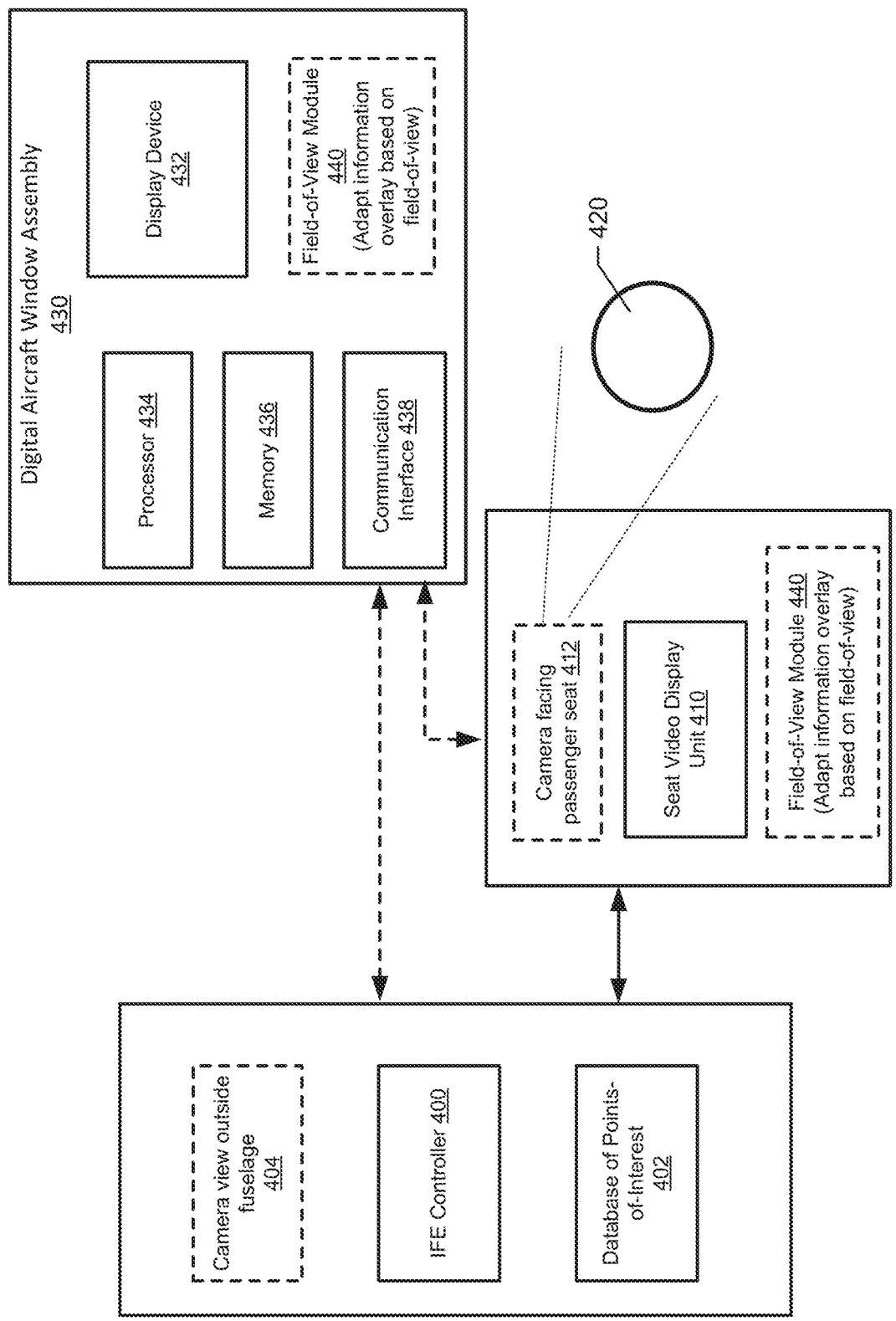
FIG. 4 illustrates a block diagram of an IFE system which is configured in accordance with some embodiments of the present disclosure.

Digital Aircraft Window Integrated into IFE System:

FIG. 4 illustrates a block diagram of an IFE system which is configured in accordance with some embodiments of the present disclosure. Referring to FIG. 4, the system includes an IFE controller 400 and database 402 identifying geographic locations of POIs and identifying corresponding information regarding the POIs which can be displayed to passengers through digital aircraft window assemblies 430 positioned along the fuselage. A digital aircraft window assembly 430 includes a display device 432, which may be a see-through display mounted on an aircraft window and which may include a touch-sensitive interface. The digital aircraft window assembly 430 can include a processor 436, a memory 436, and a communication interface 438 which is configured to communicate with the IFE controller 400 and/or with a seat video display unit 410 through a wired network, e.g., Ethernet, and/or a wireless network, e.g., WiFi (IEEE 802.11), cellular (e.g., 3GPP 4G and/or (New Radio)), etc.

In some embodiments, the digital aircraft window assembly 430 is configured to display on the display device 432 information from the database 402 that, for example, identifies POIs which can be viewed by a passenger outside the aircraft through the display device 432, such as shown in the example illustrations of any one or more of FIGS. 1-3.

The processor 434 and/or another processor of the seat video display unit 410 and/or the IFE controller 400 is/are configured to perform operations to display the information at locations on the display device 432 which are viewed as being proximately located, e.g., within a threshold distance of or overlapping, the physical objects which are viewed by the passenger outside the aircraft through the display device 432. The operations provide an augmented reality (AR) view for passengers, where real-world objects that passengers view through windows are augmented with information, which is rendered as indicia on, e.g., see-through display devices for viewing by passengers through the windows.

The operations may be performed by a field-of-view (or line-of-sight) module 440 which has been illustrated as being performed by electronics (processor) within the digital aircraft window assembly 430 and/or being performed by electronics (processor) of the seat video display unit 410 connected to the assembly 4230. The field-of-view module 440 be performed elsewhere. The operations for determining what information to display and where to display the information can be performed in various alternate ways which will now be described.

In some embodiments, the operations select 706 (FIG. 7) passenger-relevant POIs that can be viewed by a passenger seated on a particular side of the aircraft based on computing a field-of-view through the passenger's window using the aircraft geographic location (e.g., latitude and longitude), altitude, and angular pose (e.g., roll, pitch, and yaw). The field-of-view may also be computed based on any one or more of: physical dimensions of the aircraft window, distance of the passenger's head from the window, and location of the window along the side of the fuselage. For example, the field-of-view may depend upon whether the view through a particular window along the fuselage is partially blocked in an angular range by a wing, engine, or other exterior aircraft structure. For example, passenger-relevant POIs may be selected 706 (FIG. 7) for display to passengers along one side of the cabin based on those passenger-relevant POIs being determined to be within a threshold distance of the aircraft, e.g., not beyond the passenger's visual horizon and having a physical size which may be observed to the passenger at the distance, and located within a threshold angular range(s), e.g., elevation angular range and azimuth angular range, of a window along that side of the fuselage. The threshold angular range(s) may be adjusted based on any one or more of: physical dimensions of the aircraft window, distance of the passenger's head from the window, location of the window along the side of the fuselage (e.g., is part of window view blocked by a wing or engine), and any angular range in which the passenger's view through a window is blocked by part of the aircraft.

The database 402 may store information identifying geographic locations of POIs and identify indicia, e.g., graphical objects and/or text, corresponding to the POIs. The operations to select 706 the set of passenger-relevant POIs from the database 402 can be performed based on the selected passenger-relevant POIs having geographic locations that satisfy a relevance rule to the real-world objects viewable by the passenger through the window based on the aircraft pose and the field-of-view. The relevance rule may include, as explained above, selecting only POIs that are determined to be within a threshold distance of the aircraft, e.g., not beyond the passenger's visual horizon, that are determined to have at least a threshold size based on range from the aircraft (i.e., a physical size which may be observed to the passenger at the range from the aircraft), and/or that are located within a threshold angular range(s), e.g., elevation angular range and azimuth angular range, of a window along that side of the fuselage. The minimum physical size is determined based on the distance of the POI from the aircraft so the POI can be observed by the passenger. For each of the passenger-relevant POIs in the set, the operations determine 710 the AR indicia based on the graphical object and/or text defined in database 402 as corresponding to the POI.

In some embodiments, the field-of-view may be computed 704 based on video from a camera 404 that is mounted to have a view outside the fuselage, such as underneath the fuselage or on the aircraft tail to view POIs on the ground. In some embodiments, video from the outside facing camera 404 may be processed to identify POIs in the field-of-view based on the aircraft geographic location, angular pose, and which objects are identifiable in the video from the camera 404 when compared to known POIs in the database 402. The field-of-view may be computed 704 based on size of the window and distance of the passenger's head from the window, e.g., where the pose of the passenger's head relative to the window may be determined based on processing video from a camera facing the passenger and/or based on data provided by sensor(s) in the aircraft, as discussed herein.

The pose of the passenger's head relative to the window may correspond to the pose of the head relative to the window opening or may correspond to the pose of the head relative real-world objects which can be viewed by the passenger through the window opening.

The field-of-view is mapped to POIs in database 402 to identify any POIs on the ground that can be viewed by the passenger and to any POIs in the air (e.g., other aircraft, weather pattern information, etc.) that can be viewed by the passenger. Information for the viewable POIs is retrieved from database 402 and can be displayed on display device 432. In some embodiments, which of the viewable POIs are selected for display on the display device 432 may be controlled based on passenger preferences. The passenger preferences may be defined by the passenger or the operations may learn over time based on tracking which type of POIs if any the passenger selects, e.g., through a touch sensitive overlay on the display 432 or via a steerable cursor or other operations, to obtain further information from the database 402.

In some embodiments, individual items of the information are displayed at locations on the 432 so that they are viewed by the passenger as being proximately located to the respective POI associated with the information item.

Figure 7:
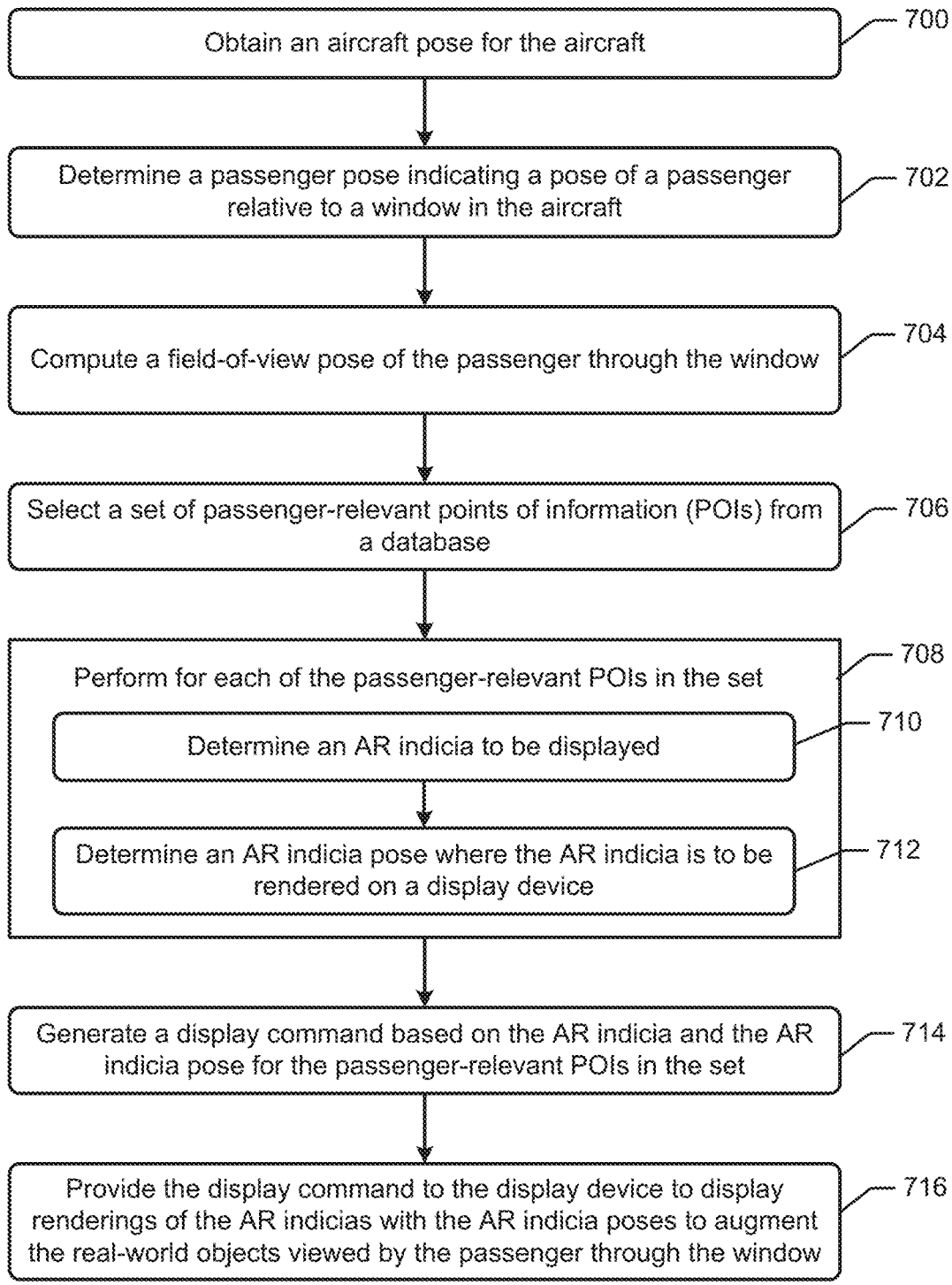
FIG. 7 illustrates a flowchart of operations by an augmented reality system for an aircraft in accordance with some embodiments of the present disclosure.

FIG. 7 illustrates a flowchart of operations by an augmented reality (AR) system for an aircraft in accordance with some embodiments of the present disclosure.

Referring to FIG. 7, the operations include obtaining 700 an aircraft pose for the aircraft, e.g., aircraft geographic location (e.g., latitude and longitude), altitude, and angular pose (e.g., roll, pitch, and yaw). Aircraft pose may be obtained from an aircraft data bus which communicates geographic location, altitude, angular pose, etc. from associated sensors to a flight computer. Operations determine 702 a passenger pose indicating a pose of a passenger relative to a window in the aircraft.

As used herein, the term "pose" refers to the location (e.g., along 2 or 3 orthogonal axes) and/or the rotation angle (e.g., about the 2 or 3 orthogonal axes), which may be relative to defined axes or relative to another object having a known pose. A pose may therefore be defined based on only the multidimensional location of the aircraft relative to ground, the passenger relative to the window or aircraft, etc., based on only the multidimensional rotational angles, or based on a combination of the multidimensional location and the multidimensional rotational angles. The term "pose" therefore is used to refer to location, rotational angle, or combination thereof.

The determination 702 of the passenger pose may indicate the pose of the passenger relative to a side of the aircraft (e.g., left or right side), window location along a side of the aircraft, location and/or angular orientation of the passenger's head and/or eye relative to a window in the aircraft.

Further operations compute 704 a field-of-view of the passenger through the window toward real-world objects viewable by the passenger through the window, based on the passenger pose and the aircraft pose. Operations select 706 a set of passenger-relevant points of information (POIs) from database 402 that satisfy a relevance rule to the real-world objects viewable by the passenger through the window based on the aircraft pose and the field-of-view. Example operations that may be performed to select 706 passenger-relevant POIs from the database 402 are explained further below.

Further operations perform 708 for each of the passenger-relevant POIs in the set, determination 710 of an AR indicia to be displayed and determination 712 of an AR indicia pose where the AR indicia is to be rendered on a display device associated with the passenger, based on the aircraft pose and the field-of-view. The database 402 can list POIs, locations of the POIs, and identify information that can or should be displayed as an AR indicia to augment the corresponding real-world objects viewed by the passenger.

The database 402 may include advertisements which can be displayed associated with various of the POIs. For example, an advertisement can be displayed in AR view on the display device as text, graphical picture(s), video, etc. for a restaurant or other business corresponding to one of the POIs viewable to a passenger. Similarly, database 402 may include information related to cities, parks, etc. which are viewable at POIs, and which can be displayed in an AR view on the display device as the respective POIs become viewable to a passenger. The information to be displayed may be in any form, including text, graphical pictures, video, etc. Advertisements and/or other information associated with a viewable POI may be displayed responsive to the system receiving a command from a user, such as the user touch-selecting a POI indicia that is displayed on a display device or providing an input selection through a PED, seat video display unit, etc. Meteorological information may be obtained from database 402 and used to display information that augments the passenger's view through a window. For example, weather patterns may be labeled through displayed AR indicia and distances to various patterns may be indicated.

The database 402 may reside onboard the aircraft or may reside on a ground-based server that is communicatively connected to the aircraft. When the database 402 resides onboard the aircraft, its content may be loaded onboard the aircraft prior to a flight and may be updated over time based on information provided from a ground-based server. Updates to database 402 may be performed based on flight route of the aircraft, current weather conditions (e.g., assessed by ground-based systems and/or aircraft weather radar), etc.

Further operations generate 714 a display command based on the AR indicia and the AR indicia pose for the passenger-relevant POIs in the set, and provide 716 the display command to the display device to display renderings of the AR indicias with the AR indicia poses to augment the real-world objects viewed by the passenger through the window.

The display device 432 can be configured as a see-through display screen that at least partially overlaps the window to display the renderings of the AR indicias with the AR indicia poses to augment the real-world objects viewed by the passenger through the window. In some embodiment, the see-through display screen may include a transparent organic light-emitting diode display screen, a liquid crystal display screen, and/or a transparent electroluminescent display screen.

In some other embodiments, the display device 432 includes a see-through mirror that at least partially overlaps the window and a projector that is operable and arranged (e.g., mounted to a ceiling, headrest of seat adjacent the window, or other cabin surface and facing the see-through mirror) to project the renderings of the AR indicias with the AR indicia poses on the see-through mirror to reflect toward the passenger and augment the real-world objects viewed by the passenger through the window.

In some embodiments, the operations track location and/or pose of the user's head or more directly track the location of the eyes using a video feed from a camera 412 which, for example, is mounted to a seatback facing the passenger's seat. The camera 412 may be part of the seat video display unit 410. The operation can then determine the user's field-of-view through the display device 432 based on the tracked location of the user's head or eyes relative to the location of the display device 432. The operations may dynamically change where information for a POI is displayed on the display device 432 (i.e., dynamically recompute 712 the AR indica pose) responsive to updated location tracking of the user's head or eyes so that the information continues to be viewed by the passenger as being proximately located to the POI as the passenger's head moves. The operations can dynamically change what POIs are selected as passenger-relevant POIs and change the computed 710 AR indica and computed 712 AR indicia pose responsive to updated aircraft pose, i.e., as the aircraft changes location, yaw, pitch, roll, etc.

The operation to determine 702 pose of the passenger's head and/or eye's in a video stream from a camera 412 facing the passenger, can include to determine pose of the camera 412 relative to the window in the aircraft which is adjacent to the passenger. Operations can then determine the passenger pose indicating the pose of the passenger relative to the window in the aircraft, based on the pose of the passenger's head and/or eye's and the pose of the camera.

In some other embodiments, the operations estimate location of the user's head or eyes based on obtaining or estimating height of a passenger seated adjacent to the window. For example, the operations may access a passenger manifest and listing of assigned seats to identify a passenger who is seated next to a window, and access a repository of passenger information to obtain the height of the passenger. Alternatively, the operations may identify the passenger through a connected PED, e.g., using a passenger airline account registered with an airline application executed by the PED, and may obtain the passenger's height through registered information. Alternatively or additionally, a seat video display unit or the PED may query the passenger to obtain the passenger's height.

Alternatively or additionally, the seats may include sensors that are configured to determine the passenger's height and which may determine the passengers head location relative to, e.g., headrest of the seat. Example sensors can include proximity sensors, light sensors, or other sensors, that are, for example, spaced apart at defined locations in an upward direction along the seat surface and/or headrest surface of the passenger's seat. In some embodiments, the operation to determine 702 the passenger pose indicating a pose of the passenger relative to the window in the aircraft, includes to determine pose of the passenger's head and/or eye's based on obtaining sensor data from at least one sensor mounted in a seat and configured to determine location of the passenger's head. The at least one sensor can include a plurality of proximity sensors spaced apart at defined locations in an upward direction along a seat surface, and adapted to determine proximity to a seated passenger and/or pressure sensors adapted to sense pressure exerted on respective by the seated passenger.

A PED may include, but is not limited to, an AR headset, a smart phone (e.g., operating to execute (host) user applications), a tablet computer, a laptop computer, a gaming device, etc.

In some other embodiments, the operations perform a calibration process to determine how the passenger's head or eyes is/are positioned relative to the location of the window. For example, operations may display a calibration indicia that the passenger can be queried to provide input, e.g., via a user interface on the seat video display unit 410, to steer the calibration indicia until it overlaps a physical object viewable through the window, such as a POI having a known location to the operations. The operations may compute the location of the user's head or eyes relative to the window, i.e., relative to locations on the display device 432, based on tracking distance and direction that the user steered the calibration indicia from a starting location to a final location where the passenger indicates the calibration indicia overlaps the physical object, and using knowledge of the location of the physical object relative to the window.

In one further embodiment, the operations perform a calibration process to determine how the passenger's head or eyes is/are positioned relative to the location of the window. The operations can include to query the passenger through the display device to provide input to steer a calibration indicia until it overlaps one of the POIs viewable through the window (i.e., which is among the POIs having information in the database 402). The operations can compute the location of the user's head or eyes relative to the window based on tracking distance and direction that the user steered the calibration indicia from a starting location to a final location where the passenger indicates the calibration indicia overlaps the POI, and based on the location of the POI relative to the window.

Any passengers with a view of the window can have their head (e.g., eyes) location and orientation tracked. Tracked passengers can include a passenger at the window seat or another passenger sitting further from the window such as adjacent to an aisle of the cabin. In one embodiment, an average of the pose (e.g., location and orientation) of the heads (eyes) of all passengers in a row of the airplane is determined, and the operations compute the AR indicia poses for displaying the information relative to the viewable POIs based on a defined combination of the average poses of the heads (eyes) so that the information is displayed with proximate relevance to the POIs when viewed by any of those passengers through the window. For example, the operation to determine 702 a passenger pose indicating a pose of a passenger relative to a window in the aircraft, can include to determine pose of passengers seated in a row associated with the window, and compute an average of the poses of the passengers. The field-of-view pose can then be computed 704 based on the average of the poses. In this manner, the AR indicia is displayed with an indicia pose that allows each of the passengers in a row to obtain an AR view of the real-world viewed through window, but may result in a compromise of accuracy in how the AR indica is posed relative to the real-world POI.

In another embodiment, the operations may determine which passenger in a row is currently looking toward the window, such as by using one or more cameras 412 mounted in seatback(s) with a view of those passengers. When the operations identify that a single passenger is looking toward the window, the operations can adapt where the information is displayed (AR indicia poses) on display device 432 based on the location of that passenger's head or eyes relative to the window. When that passenger is determined to have looked away from the window and another passenger is determined to have subsequently looked towards the window, the operations can further adapt where the information is displayed on the display device 432 based on the pose of that other passenger's head relative to the window.

A corresponding operation to determine 702 a passenger pose indicating a pose of a passenger relative to a window in the aircraft, can include to determine pose of passengers seated in a row associated with the window, and to compute an average of the poses of the passengers. The field-of-view pose is then computed 704 based on the average of the poses.

Another corresponding operation to determine 702 a passenger pose indicating a pose of a passenger relative to a window in the aircraft, can include to determine which of a plurality of passengers in a row is currently looking toward the window associated with the row. Responsive to the operations identifying that at least two of the passengers are looking toward the window, the operations compute the passenger pose based on a combination of poses determined for the at least two of the passengers. In contrast, responsive to the operations identifying that a single passenger is looking toward the window, the operations compute the passenger pose based on only the pose determined for the single passenger Although various embodiments have been described in the context of determining the location or orientation of a passenger's head relative to the window, these embodiments can similarly operate to determine the location or orientation of the passenger's eyes relative to the window. For example, when a sensor can determine the location of a passenger's head, the operations can estimate where the passenger's eyes are located relative to the window and responsively control where information is displayed on the display device 432 so that the passenger views that information proximately located to the corresponding POIs which are viewable through the window. The term head can therefore interchangeably be replaced with the term eyes without deviating from the scope of the present embodiments.

Although embodiments herein are primarily described in the context of AR systems for aircraft, the invention is not limited thereto. Instead, these and other related embodiments may be used to provide AR systems for other types of vehicles, including without limitation, trains, automobiles, cruise ships, and buses.

Digital Aircraft Window at Least Partially Integrated into Passenger Electronic Device:

Example embodiments have been explained that can be at least partially performed by IFE system components deployed on board an aircraft, such as the display device 432 which may be part of a window assembly, the field-of-view module 440 which may be performed by the seat video display unit 410 and/or by the IFE controller 400, the database 402 which may be part of a IFE content server, etc.). However, these embodiments are not limited to being performed by such IFE system components. These and other embodiments can alternatively be performed at least partially by passenger electronic devices (PEDs).

Figure 6:
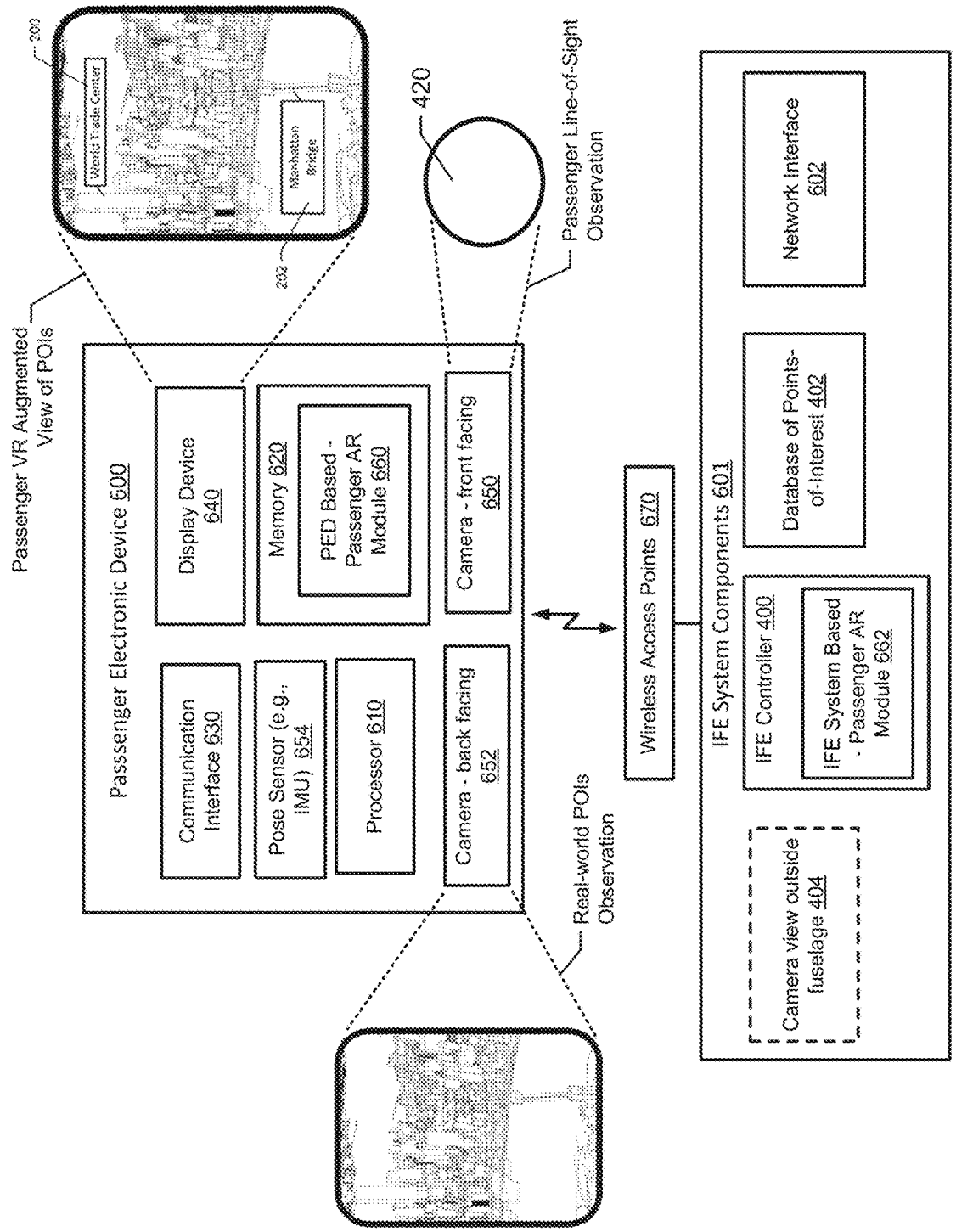
FIG. 6 illustrates a block diagram of a system operative to provide virtual reality augmented views of real-world points-of-interest using passenger electronic devices and IFE system components in accordance with some embodiments of the present disclosure.

FIG. 6 illustrates a block diagram of a system providing virtual reality augmented views of real-world points-of-interest using PEDs, and which may further use IFE system components in accordance with some embodiments of the present disclosure.

Referring to FIG. 6, a PED 600 includes at least one processor 610 ("processor"), at least one memory 620 ("memory"), at least one communication interface 630 ("communication interface"), a pose sensor 654 (e.g., inertial measurement unit (IMU)), a display device 640, a backward facing camera 652 (e.g., field-of-view through a back surface of PED), and a front facing camera 650 (e.g., field-of-view through through a front surface of PED). The memory can store a PED-based passenger AR module 660 which operates to generate an AR augmented view of the POIs viewable through the window or may communicate with the IFE system components 601 (e.g., the IFE system based passenger AR module 662) to generate the AR augmented view.

The PED-based passenger AR module 660 may be downloaded by the passenger from the IFE system component 601 after the PED 600 has become paired with a seat video display unit and/or with the IFE controller 400 via the wireless access point 670. Alternatively, the PED based passenger AR module 660 may be downloaded from a ground-based server, such as an application server, before the flight or during the flight via an air-to-ground communication link (e.g., satellite communication network).

In some embodiments, a passenger can hold (or mount) the PED 600 in front of an aircraft window with the backward facing camera 652 oriented to view the real-world through the window. The PED 600 may communicate with the IFE system components 601 to identify POIs captured in the video and to generate AR indica which can be displayed on the display device 640 of the PED 600 as an overlay on the video of the real-world from the backward facing camera 652. Alternatively or additionally, the PED 600 may work with the IFE system components 601 to identify POIs and generate AR indicia which can be displayed on a seat video display unit associated with the passenger's seat, and where the AR indicia can overlaid on the video of the real-world from the backward facing camera 652, on video from another camera (e.g., aircraft based camera) configured to view the outside world, and on another graphical representation of the outside world.

The communication interface 630 may be configured for wireless communication which may include, but is not limited to, a Bluetooth transceiver, a WLAN transceiver (IEEE 802.11 A-D, IEEE 802.11 A-C, or other IEEE 802.11), a 4G LTE, 5G NR, or other cellular transceiver, or other RF communication transceiver configured to communicate with wireless access points 670 in the aircraft. As will be explained in further detail below, the PED 600 may communicate through the communication interface 630 and wireless access points 670 with IFE system components 601. The IFE system components 601 can include the camera 404 mounted to view outside the fuselage, the IFE controller 400 with an IFE system based passenger AR module 662, the database 402 of points of interest, and a network interface, etc. Although the database 402 is illustrated in FIG. 6 as being separate from the PED 600, it may instead reside in the memory 620 and/or may reside on a ground-based server that is communicatively connected to the PED 600 through ground datalink, e.g., satellite communication network and/or terrestrial communication network.

The processor 610 may include one or more data processing circuits, such as a general purpose and/or special purpose processor (e.g., microprocessor and/or digital signal processor) that may be collocated or distributed across one or more networks. The processor 610 is configured to execute computer program code in memory 620, described below as a non-transitory computer readable medium, to perform at least some of the operations described herein as being performed by an access control computer. The computer program code can include a PED-based passenger AR module which, when executed by the processor 610, causes the processor 610 to perform operations in accordance with one or more embodiments disclosed herein for providing an AR view of POIs to a passenger.

The processor 610 may perform the operation to determine 702 a passenger pose indicating a pose of a passenger relative to a window in the aircraft, can include to process video from the front-facing camera 650 to determine pose of the passenger's head 420 and/or eyes relative to the front-facing camera 650. The operations can further include processing video from the back-facing camera 652 to determine pose of the window relative to the back-facing camera 652. The operations can then determine pose of the passenger's head and/or eyes relative to the window based on the determined pose of the passenger's head and/or eyes relative to the front-facing camera 650 and based on the determined pose of the window relative to the back-facing camera 652.

The PED 600 and/or the IFE controller 400 may operate to select 706 the set of passenger-relevant POIs from the database 402 based on processing video from the camera 650/652 while the passenger has arranged the camera 650/652 to face through the window to identify candidate real-world objects captured by the camera through the window. The operations can correlate the identified candidate real-world objects with passenger-relevant POIs in the database based on the aircraft pose, and which may be further based on the passengers pose (e.g., one or more of the seated side of the aircraft, the seat location, the pose of head/eyes location, etc.). In this manner, the passenger may hold the camera of the PED 600 view through the window, and because the PED 600 and/or the IFE system components 601 (e.g., IFE controller 400, and/or seat video display unit 410) to determine what the passenger is viewing through the window and select the set of passenger-related POIs based thereon.

The processor 610 of the PED 600 may perform the operation to compute 704 the field-of-view pose of the passenger through the window, such as based on processing video from the camera 650,652 capturing the passenger's view through the window. The processor 610 may perform the operation to select 706 the passenger-relevant POIs that can be viewed by a passenger.

The processor 610 of the PED 600 may perform 708 for each of the passenger-relevant POIs in the set, the operation to determine 710 an AR indicia to be displayed and determination 712 of an AR indicia pose where the AR indicia is to be rendered on a display device associated with the passenger, based on the aircraft pose and the field-of-view.

The processor 610 of the PED 600 may perform the operations to generate 714 a display command based on the AR indicia and the AR indicia pose for the passenger-relevant POIs in the set, and provide 716 the display command to the display device to display renderings of the AR indicias with the AR indicia poses to augment the real-world objects viewed by the passenger through the window. The display device may correspond to display device 640 of the PED 600 and/or may correspond to a see-through display device 432 that is part of the window assembly or configured to project images on the a see-through mirror on the window.

In some other embodiments, the PED 600 works more cooperatively with the IFE system components 601 to perform the operations according to embodiments herein.

For example, a processor of the IFE controller 400 and/or the seat video display unit 410 may perform the operation to compute 704 the field-of-view pose of the passenger through the window, such as based on processing video from the PED camera 650,652 capturing the passenger's view through the window. Alternatively, the processor of the IFE controller 400 and/or the seat video display unit 410 may receive the computed field-of-view pose from the PED 600. The processor of the IFE controller 400 and/or the seat video display unit 410 may perform the operation to select 706 the passenger-relevant POIs that can be viewed by a passenger. Aircraft pose may be obtained by the IFE controller 400 from an aircraft data bus which communicates geographic location, altitude, angular pose, etc., and provided to the PED 600.

The processor of the IFE controller 400 and/or the seat video display unit 410 may perform 708 for each of the passenger-relevant POIs in the set, the operation to determine 710 an AR indicia to be displayed and determination 712 of an AR indicia pose where the AR indicia is to be rendered on a display device associated with the passenger, based on the aircraft pose and the field-of-view.

The processor 610 of the PED 600 may provide the determined AR indica and determined AR indica pose to the PED 600 to generate 714 a display command based on the AR indicia and the AR indicia pose for the passenger-relevant POIs in the set, and provide 716 the display command to the display device 640 to display renderings of the AR indicias with the AR indicia poses to augment the real-world objects viewed by the passenger through the window.

Alternatively or additionally, the processor 610 of the PED 600 use the determined AR indica and determined AR indica pose to generate 714 a display command based on the AR indicia and the AR indicia pose for the passenger-relevant POIs in the set, and provide 716 the display command to the window-based display device 640 and/or to the PED-based display device 640 to display renderings of the AR indicias with the AR indicia poses to augment the real-world objects viewed by the passenger through the window.

In some further embodiments, a passenger can digitally change the background of what is seen through the window.

For example, the passenger can display content on the display device 432 that can be viewed as an overlay of the real-world outside the aircraft or can be viewed more opaquely to cover-up or obscure what is outside the aircraft. For example, content provided by National Geographic, oceanic terrain maps, and/or other sources of views under the sea can be displayed. The content may be selected to correspond to the sea floor or other submerged objects, e.g., shipwrecks, reefs, etc., that are beneath a portion of the ocean which is presently viewable through the window. The system may log usage data that indicates what content was selected by passengers. The usage data may be provided as a raw log or may be processed to generate statistics, and which can be provided to a ground-based server for analysis and use for monetization and determining content updates in the future.

In some other embodiments, the digital aircraft window assembly may use a PED which is held by a passenger or mounted to a side of the cabin. For example a passenger may hold a PED, e.g., to be aligned with the window, or the PED may be mounted to a cabin surface, such as a window shade. When held by a passenger or mounted to a window shade or other structure adjacent to a window, the PED may be positioned so a camera of the PED is used to stream a video view through the window of POIs outside the aircraft. An application on the PED may generate a composite view that overlays information for the POIs on the video stream from the PED camera, so that the passenger can see a virtual window view of POIs outside the aircraft with overlaid information. Alternatively, the PED may display a composite view of a video stream from the camera 404 mounted to view outside the fuselage with computer overlayed information for the POIs which are determined to be viewable in the video stream. In still another embodiment, the seat video display unit 410 may be configured to display a composite view of a video stream from the camera 404 mounted to view outside the fuselage with computer overlayed information for the POIs which are determined to be viewable in the video stream.

Figure 5:
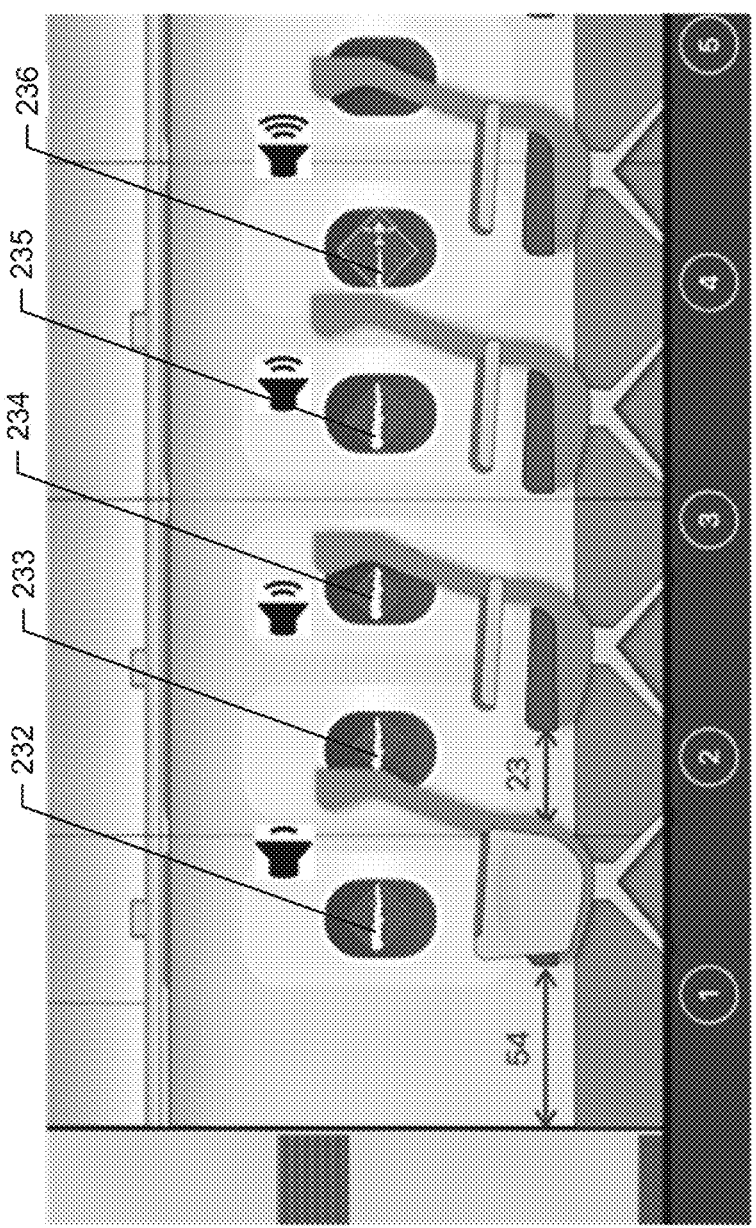
FIG. 5 illustrates a sequence of digital aircraft windows along a side of an aircraft cabin which are controlled to display animated images in accordance with some embodiments of the present disclosure.

In some other embodiments, the system is configured to display a composite image that extends across a plurality of windows. The composite image may be played with corresponding surround sound that provides an immersive visual and audible experience to passengers. FIG. 5 illustrates five digital aircraft windows along a side of an aircraft cabin which are controlled to display animated images in accordance with some embodiments of the present disclosure. Referring to the illustrated example of FIG. 5, five digital aircraft windows 232-236 along a side of an aircraft cabin are controlled to display a dynamic animation of an aircraft flying past a side of the cabin and trailed by a contrail. As the animated aircraft passes windows 232-236, some of the windows display the aircraft while other windows display the trailing contrail following aircraft. In a particular image of FIG. 5, the digital aircraft windows 232-235 are momentarily displaying the contrail while the digital aircraft window 236 is momentarily displaying the aircraft which is simulated to continue flying toward the rear of the aircraft. Passenger seated along corresponding rows of aircraft may be streamed and audible indication as the aircraft passes their respective window.

Further Embodiments and Definitions

In the above-description of various embodiments of the present invention, it is to be understood that the terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of this specification and the relevant art and will not be interpreted in an idealized or overly formal sense expressly so defined herein.

When an element is referred to as being "connected", "coupled", "responsive", or variants thereof to another node, it can be directly connected, coupled, or responsive to the other element or intervening element may be present. In contrast, when an element is referred to as being "directly connected", "directly coupled", "directly responsive", or variants thereof to another element, there are no intervening element present. Like numbers refer to like element throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" includes any and all combinations of one or more of the associated listed items.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks.

A tangible, non-transitory computer-readable medium may include an electronic, magnetic, optical, electromagnetic, or semiconductor data storage system, apparatus, or device. More specific examples of the computer-readable medium would include the following: a networked storage server, a networked computing server, a random access memory (RAM) circuit, a read-only memory (ROM) circuit, an erasable programmable read-only memory (EPROM or Flash memory) circuit, a portable compact disc read-only memory, and a portable digital video disc read-only memory.

The computer program instructions may also be loaded onto a computer and/or other programmable data processing apparatus to cause a series of operational steps to be performed on the computer and/or other programmable apparatus to produce a computer-implemented process such that the instructions which execute on the computer or other programmable apparatus provide steps for implementing the functions/acts specified in the block diagrams and/or flowchart block or blocks. Accordingly, embodiments of the present invention may be embodied in hardware and/or in software (including firmware, resident software, microcode, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated. Moreover, although some of the diagrams include arrows on communication paths to show a primary direction of communication, it is to be understood that communication may occur in the opposite direction to the depicted arrows.

Many different embodiments have been disclosed herein, in connection with the above description and the drawings. It will be understood that it would be unduly repetitious and obfuscating to literally describe and illustrate every combination and subcombination of these embodiments. Accordingly, the present specification, including the drawings, shall be construed to constitute a complete written description of various example combinations and subcombinations of embodiments and of the manner and process of making and using them, and shall support claims to any such combination or subcombination.

Many variations and modifications can be made to the embodiments without substantially departing from the principles of the present invention. All such variations and modifications are intended to be included herein within the scope of the present invention.

The invention claimed is:

1. An augmented reality (AR) system for an aircraft, the AR system comprising:
    at least one network interface;
    at least one processor connected to communicate through the at least one network interface; and
    at least one memory storing instructions executable by the at least one processor to perform operations comprising to:
        obtain an aircraft pose for the aircraft;
        determine a passenger pose indicating a pose of a passenger relative to a window in the aircraft;
        compute a field-of-view of the passenger through the window toward real-world objects viewable by the passenger through the window, based on the passenger pose and the aircraft pose;
        select a set of passenger-relevant points of information (POIs) from a database that satisfy a relevance rule to the real-world objects viewable by the passenger through the window based on the aircraft pose and the field-of-view;
        for each of the passenger-relevant POIs in the set,
            determine an AR indicia to be displayed, and
            determine an AR indicia pose where the AR indicia is to be rendered on a display device associated with the passenger, based on the aircraft pose and the field-of-view;
        generate a display command based on the AR indicia and the AR indicia pose for the passenger-relevant POIs in the set; and
        provide the display command to the display device to display renderings of the AR indicias with the AR indicia poses to augment the real-world objects viewed by the passenger through the window.

2. The AR system of claim 1, further comprising:
    the database comprising information identifying geographic locations of POIs and identifying graphical objects and/or text corresponding to the POIs;
    the operation selects the set of passenger-relevant POIs from the database based on the selected passenger-relevant POIs having geographic locations that satisfy the relevance rule to the real-world objects viewable by the passenger through the window based on the aircraft pose and the field-of-view; and
    for each of the passenger-relevant POIs in the set, the operation determines the AR indicia based on the graphical object and/or text corresponding to the POI.

3. The AR system of claim 2, wherein the operation to select the set of passenger-relevant POIs from the database based on the selected passenger-relevant POIs having geographic locations that satisfy the relevance rule to the real-world objects viewable by the passenger through the window based on the aircraft pose and the field-of-view, comprises to:
  select only POIs that are determined to be within a threshold distance of the aircraft and to have at least a minimum physical size, wherein the minimum physical size is determined based on the distance of the POI from the aircraft so the POI can be observed by the passenger.

4. The AR system of claim 3, wherein the operation to select only POIs that are determined to be within a threshold distance of the aircraft and have a physical size which can be observed by the passenger, further comprises to:
  select only POIs that are determined to be located within a threshold angular range of the window along a fuselage of the aircraft, and to be within the threshold distance of the aircraft, and to have at least the minimum physical size which is based on the distance of the POI from the aircraft so the POI can be observed by the passenger.

5. The AR system of claim 1, further comprising:
  the display device configured as a see-through display screen that at least partially overlaps the window to display the renderings of the AR indicias with the AR indicia poses to augment the real-world objects viewed by the passenger through the window,
  wherein the see-through display screen comprises a transparent organic light-emitting diode display screen, a liquid crystal display screen, or a transparent electroluminescent display screen.

6. The AR system of claim 1, further comprising:
  the display device comprises a see-through mirror that at least partially overlaps the window and a projector that is operable and arranged to project the renderings of the AR indicias with the AR indicia poses on the see-through mirror to reflect toward the passenger and augment the real-world objects viewed by the passenger through the window.

7. The AR system of claim 1, wherein the operation to determine a passenger pose indicating a pose of a passenger relative to a window in the aircraft, comprises to:
  determine pose of the passenger's head and/or eye's in a video stream from a camera facing the passenger;
  determine pose of the camera relative to the window in the aircraft; and
  determine the passenger pose indicating the pose of the passenger relative to the window in the aircraft, based on the pose of the passenger's head and/or eye's and the pose of the camera.

8. The AR system of claim 1, wherein the operation to determine a passenger pose indicating a pose of a passenger relative to a window in the aircraft, comprises to:
  determine pose of the passenger's head and/or eye's based on obtaining or estimating height of the passenger based on accessing a repository of passenger information to obtain the height of the passenger or based on querying the passenger to provide the height.

9. The AR system of claim 1, wherein the operation to determine a passenger pose indicating a pose of a passenger relative to a window in the aircraft, comprises to:
  determine pose of the passenger's head and/or eye's based on obtaining sensor data from at least one sensor mounted in a seat and configured to determine location of the passenger's head, wherein the at least one sensor comprises a plurality of proximity sensors spaced apart at defined locations an upward direction along a seat surface, and adapted to determine proximity to a seated passenger and/or pressure sensors adapted to sense pressure exerted on respective by the seated passenger.

10. The AR system of claim 1, wherein the operation to determine a passenger pose indicating a pose of a passenger relative to a window in the aircraft, comprises to:
  perform a calibration process to determine how the passenger's head or eyes is/are positioned relative to the location of the window.

11. The AR system of claim 10, wherein the operation to perform a calibration process to determine how the passenger's head or eyes is/are positioned relative to the location of the window, comprises to:
  query the passenger through the display device to provide input to steer a calibration indicia until it overlaps one of the POIs viewable through the window; and
  compute the location of the user's head or eyes relative to the window based on tracking distance and direction that the user steered the calibration indicia from a starting location to a final location where the passenger indicates the calibration indicia overlaps the POI, and based on the location of the POI relative to the window.

12. The AR system of claim 1, wherein the operation to determine a passenger pose indicating a pose of a passenger relative to a window in the aircraft, comprises to:
  determine pose of passengers seated in a row associated with the window; and
  compute an average of the poses of the passengers,
  wherein the field-of-view pose is computed based on the average of the poses.

13. The AR system of claim 1, wherein the operation to determine a passenger pose indicating a pose of a passenger relative to a window in the aircraft, comprises to:
  determine which of a plurality of passengers in a row is currently looking toward the window associated with the row;
  responsive to the operations identifying that at least two of the passengers are looking toward the window, computing the passenger pose based on a combination of poses determined for the at least two of the passengers; and
  responsive to the operations identifying that a single passenger is looking toward the window, computing the passenger pose based on only the pose determined for the single passenger.

14. The AR system of claim 1, further comprising:
  a passenger electronic device (PED) comprising a front-facing camera and a back-facing camera,
  wherein the operations to determine a passenger pose indicating a pose of a passenger relative to a window in the aircraft, comprises:
    process video from the front-facing camera to determine pose of the passenger's head and/or eyes relative to the front-facing camera;
    process video from the back-facing camera to determine pose of the window relative to the back-facing camera; and
    determine pose of the passenger's head and/or eyes relative to the window based on the determined pose of the passenger's head and/or eyes relative to the front-facing camera and based on the determined pose of the window relative to the back-facing camera.

15. The AR system of claim 1, further comprising:
  a passenger electronic device (PED) comprising a camera,
  wherein the operations to select a set of passenger-relevant POIs from the database, comprises:

processing video from the camera while the passenger has arranged the camera to face through the window to identify candidate real-world objects captured by the camera through the window; and correlate the identified candidate real-world objects with passenger-relevant POIs in the database based on the aircraft pose.

16. A computer program product for augmented reality (AR) system for an aircraft, the computer program product comprising a non-transitory computer readable medium storing instructions executable by at least one processor of the AR system to perform operations to:

obtain an aircraft pose for the aircraft;

determine a passenger pose indicating a pose of a passenger relative to a window in the aircraft;

compute a field-of-view of the passenger through the window toward real-world objects viewable by the passenger through the window, based on the passenger pose and the aircraft pose;

select a set of passenger-relevant points of information (POIs) from a database that satisfy a relevance rule to the real-world objects viewable by the passenger through the window based on the aircraft pose and the field-of-view;

for each of the passenger-relevant POIs in the set,
determine an AR indicia to be displayed, and
determine an AR indicia pose where the AR indicia is to be rendered on a display device associated with the passenger, based on the aircraft pose and the field-of-view;

generate a display command based on the AR indicia and the AR indicia pose for the passenger-relevant POIs in the set; and provide the display command to the display device to display renderings of the AR indicias with the AR indicia poses to augment the real-world objects viewed by the passenger through the window.

* * * * *